(No Model.)

J. R. SMITH.
GLOVE FASTENER.

No. 436,158. Patented Sept. 9, 1890.

Witnesses
J. K. Shumway
Lillian D. Kelsey

Joseph R. Smith
Inventor
By attys
Earle Seymour

UNITED STATES PATENT OFFICE.

JOSEPH R. SMITH, OF WATERBURY, CONNECTICUT, ASSIGNOR TO THE WATERBURY BUTTON COMPANY, OF SAME PLACE.

GLOVE-FASTENER.

SPECIFICATION forming part of Letters Patent No. 436,158, dated September 9, 1890.

Application filed March 10, 1890. Serial No. 343,298. (No model.)

*To all whom it may concern:*

Figure 1:
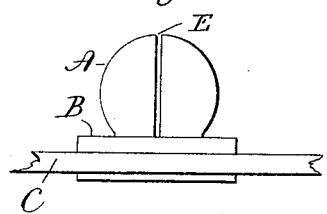
Figure 2:
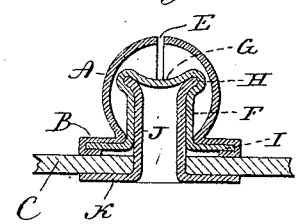
Figure 3:
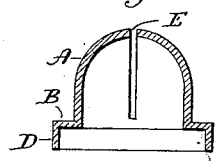
Figure 4:
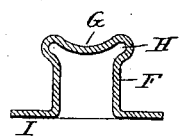
Figure 5:
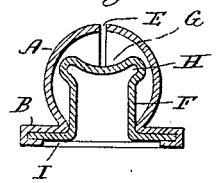

Be it known that I, JOSEPH R. SMITH, of Waterbury, in the county of New Haven and State of Connecticut, have invented a new Improvement in Glove-Fasteners; and I do hereby declare the following, when taken in connection with accompanying drawings, and the letters of reference marked thereon, to be a full, clear, and exact description of the same, and which said drawings constitute part of this specification, and represent, in Figure 1, a section of a glove-flap, showing the ball member attached; Fig. 2, a vertical central section of the same; Fig. 3, a vertical section of the stud-blank detached and preparatory to the introduction of the anvil portion; Fig. 4, a vertical section of the anvil portion detached; Fig. 5, a vertical section showing the two parts as set together; and Fig. 6, a vertical section of the fastening device or eyelet.

This invention relates to an improvement in that class of glove-fasteners in which the fastener consists of two parts—one part of ball shape, which is attached to one flap of the glove, commonly called the "ball member," and the other part of a corresponding socket shape and adapted to be attached to the other flap of the glove, and commonly called the "socket member." These fasteners are of two classes. In one case the ball member is solid and unyielding, and the socket is provided with an elastic part to grasp the ball as it is inserted into the socket. In the other case the socket is unyielding and the ball member slit in the plane of its axis, to give to it a contractibility to permit it to pass into the socket. The ball member being elastic yields to enter the socket and then expands to engage with the socket.

This invention is applicable especially to this latter class, in which the ball member is elastic, the object of the invention being a cheap, simple, and durable construction of the ball member, and it consists in the construction as hereinafter described, and particularly recited in the claim.

In the illustration I show only the ball member of the fastener. The socket may be any of the known constructions.

A represents the stud or portion of the ball member, which is of spherical shape, and B the flange surrounding the base of the ball, which is adapted to rest upon one side of the flap C, the securing device being introduced from the reverse side through an opening in the flap to enter and engage the interior of the stud. As seen in Fig. 3, the stud A is made a part of the flange B, and this flange is constructed with a rim D around its outer edge, producing a cup-shaped back for the stud. This blank is drawn from sheet metal, the diameter of the flange B corresponding substantially to the flange required to rest upon the surface of the flap. To make the stud elastic, it is slit, as at E, in the plane of the axis, the slits extending to the flange—that is, through the whole length of the stud proper—there being as many such slits as may be desirable to give it the requisite elasticity to permit its expansion and contraction. As represented in Fig. 3, the blank is drawn up, leaving the stud of substantially equal diameter from the flange upward, subsequent operations bringing this stud into the required spherical shape, and so as to make the opening into the stud of considerably less diameter than the maximum diameter of the interior of the stud, as clearly seen in Fig. 5.

F represents the second or anvil part of the stud. (Shown detached in Fig. 4.) This part is of tubular shape, but closed at its upper end. That end is depressed to form a convex surface upon the inside, which will serve as the anvil, the closed end being upset to enlarge the space around the anvil—that is, to make that space around the anvil of larger diameter than the interior of the tubular portion below. At the open end this part F is constructed with an annular flange I, corresponding in external diameter to the interior of the rim D of the flange B, and the external diameter of the upset or anvil end of this part F is of considerably less diameter than the diameter of the interior of the stud, and so as to leave a free space within the stud proper around the said anvil portion F, and the two parts are set together so as to bring the flange I onto the flange B, as seen in Fig. 5. Then the rim D is closed over the outer edge of the flange I, so as to secure the two parts together, as seen in Fig. 5. In this operation of closing the stud may be brought to its spherical shape, or the spherical shape may be produced before or after the parts are closed together. This completes the stud. The open end of the part F is outward or on the back of the stud, and the anvil G within the stud presents its convex surface toward this opening.

Figure 6:
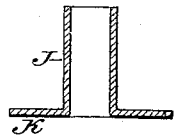

The fastening device consists of a tube J, corresponding in external diameter to the interior of the part F, and is constructed with an annular flange K around one end, as seen in Fig. 6, which corresponds in diameter substantially to the diameter of the flange B of the stud. The tubular portion of this fastening device is adapted to enter the opening in the back of the stud, and so that its unflanged end will strike the anvil G, and under the force applied for the insertion of the fastening device that end will be expanded so as to extend into the enlarged space H around the anvil. In securing this ball member the stud portion is placed upon one side of the flap C, the flap being pierced corresponding to the opening in the back of the member. Then the fastening device is introduced, the tube J passing through the said perforation in the flap and into the opening in the back of the member. Then sufficient force is applied to bring the flange K of the fastening device hard upon the surface of the flap. The end of the tubular portion of the fastener strikes the anvil and is deflected, causing its expansion into the enlarged portion H around the anvil, as seen in Fig. 2. Under this construction the ball member is composed of two parts only, thus making it extremely simple and cheap in its construction yet strong and durable. By constructing the stud of spherical shape and of larger internal diameter from the base upward than the anvil portion F, and by extending the slits throughout the entire length of the stud, the stud becomes elastic from its base upward, thus giving a very much greater extent of elasticity than could be had were the stud proper constructed so as to bear directly upon the surface of the anvil portion, and whereby the elasticity of the stud could extend only from the anvil outward.

It will be understood that instead of closing the edge of the flange B around the flange I of the anvil portion, the flange I may be of larger diameter and closed around the edge of the flange B to unite the parts, these being both common expedients for uniting parts in buttons.

From the foregoing it will be understood thot I do not claim, broadly, a ball member of a glove-fastener having an anvil within it combined with a tubular or eyelet-shaped fastening device adapted to enter the back and be upset within the ball by said anvil; but what I do claim is—

The herein-described ball member of a glove-fastener, consisting of the spherical-shaped hollow stud A, constructed with an annular flange B around its open end, the opening through said flange being of less diameter than the maximum diameter of the stud, and the said stud constructed with one or more slits E, extending from the said flange through the opposite end of the stud and entirely across the spherical point laterally, combined with the anvil part F of tubular shape, the tube closed at one end, the said closed end of convex shape upon its under side to form the anvil G, and that end expanded to form a recess H around the anvil of larger diameter than the internal diameter of the tubular portion, the said tubular portion and anvil being of less diameter than the internal diameter of the stud, and so as to leave a clear space within the stud around the said tubular anvil portion, the open end of the tube constructed with an annular flange I, corresponding in diameter substantially to the flange B, the said anvil part set within the stud, and the flanges I and B, the edge of one closed over the edge of the other to unite the two parts, substantially as described.

JOSEPH R. SMITH.

Witnesses:
A. C. MINTIE,
NEWTON C. SMITH.